Jan. 3, 1933. C. COHEN-VENEZIAN 1,893,227
VEHICLE FOR CARRYING AIRCRAFT PARTS AND OTHER LOADS
Filed March 12, 1931 2 Sheets-Sheet 1

Jan. 3, 1933.    C. COHEN-VENEZIAN    1,893,227
VEHICLE FOR CARRYING AIRCRAFT PARTS AND OTHER LOADS
Filed March 12, 1931    2 Sheets-Sheet 2
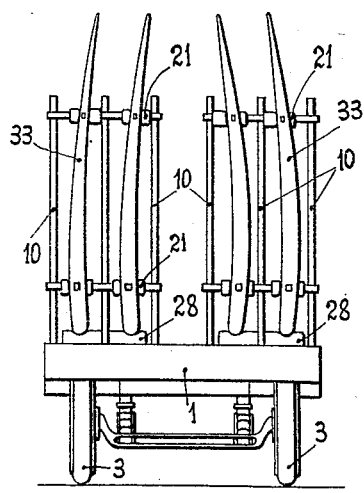
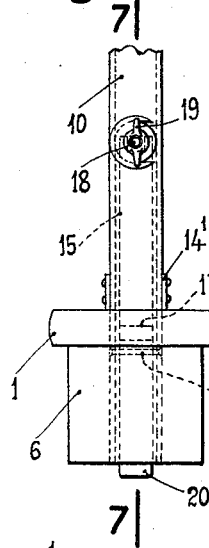
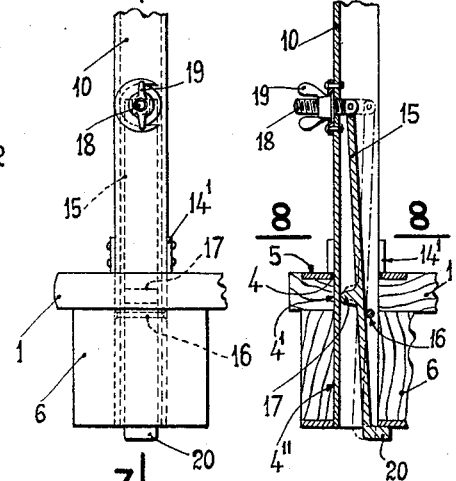
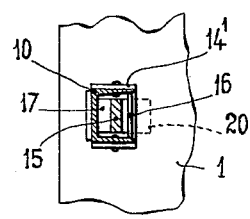
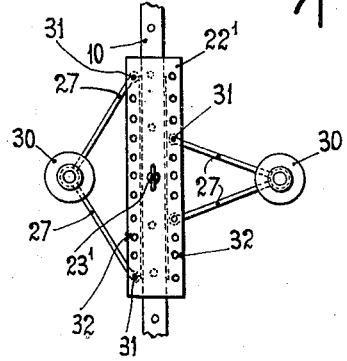
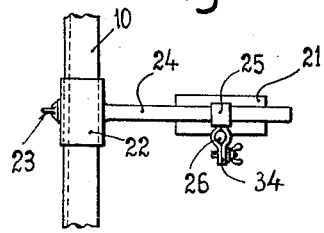
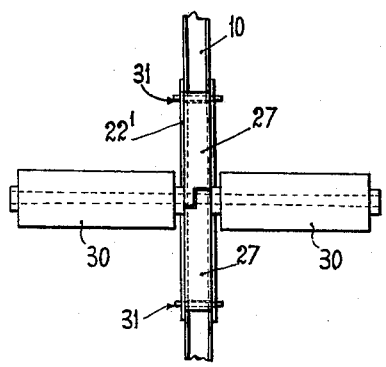
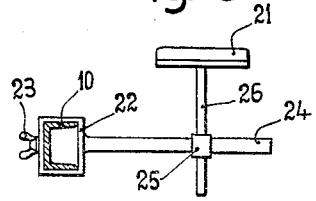
Inventor:
C. Cohen-Venezian
by
Atty Patented Jan. 3, 1933

1,893,227

UNITED STATES PATENT OFFICE

CARLO COHEN-VENEZIAN, OF TURIN, ITALY

VEHICLE FOR CARRYING AIRCRAFT PARTS AND OTHER LOADS

Application filed March 12, 1931, Serial No. 522,086, and in Italy March 18, 1930.

This invention has for its object a vehicle enabling to convey satisfactorily parts of aircrafts and the like and which has means on its platform or frame enabling to fasten on the vehicle supporting means adapted to hold in position the parts to be carried.

In the vehicle of this invention fastening means may be distributed in any preferred manner on the whole extent and at any point of the vehicle platform or frame, thus enabling to fasten thereon members having a complicated outline and also members shorter than the vehicle frame, and, further, a number of parts having different sizes and shapes.

An embodiment of the present invention is shown by way of example on the annexed drawings.

In said drawings:

Figure 4 is an end view of Figure 3;

Figure 5 is a vertical section on an enlarged scale and on line 5—5 of Figure 1.

Figure 6 is a side view on an enlarged scale of the portion of a vehicle platform adjacent to an upright fastened thereon to support parts to be conveyed;

Figure 7 is a transverse vertical section on line 7—7 of Figure 6;

Figure 8 is a horizontal section on line 8—8 of Fig. 7;

Figure 9 shows separately a portion of an upright adapted to carry a pad for supporting an aircraft wing;

Figure 10 is a plan view of the same;

Figure 11 is a side view of a device adjustable on an upright and adapted to support wings;

Figure 12 is a front view of the same.

Figure 1:
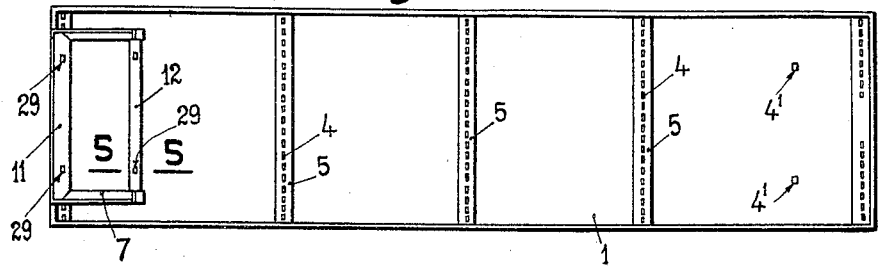
Figure 1 is a plan view of a vehicle platform equipped in accordance with this invention.

The present invention may be embodied in a motor vehicle or in a trailed one, it being adapted for vehicles of any kind and construction.

In Figures 1-5, 1 denotes the platform of a vehicle which is carried by a frame 2 mounted on wheels 3. On said platform 1 means are provided for temporarily or removably locating thereon uprights or supports of any kind as 10 adapted to fasten aeroplane parts as fuselages, wings, rudders and the like on said vehicle.

In the illustrated embodiment said means comprise square-cross-section holes 4 provided in rows in a plurality of members 5 arranged on platform 1 transversely to the same and spaced apart from each other, and also further holes 4' provided at suitable points of the platform 1.

To impart said holes 4 a suitable vertical extent in the platform for securing a safe engagement of uprights and the like therein, blocks or transverse members 6 are provided under the platform 1, in registration with holes 4, 4', said blocks or members 6 having holes 4'' registering with the holes 4, 4'.

Of course other engaging means could be used for the same purpose instead of holes 4, 4' said engaging means being only required to be able to cooperate with engaging means provided on uprights or supports, to hold them and parts fastened thereby in correct position; said engaging means could also be provided on the vehicle frame or in parts thereof.

In the illustrated embodiment in which said vehicle engaging means consist of holes as 4, 4', 4'', each upright as 10 has its end portion adapted to be nested in one of sets of cooperating holes 4, 4', 4'', said uprights being clamped in position by suitable means as hereinafter described.

Figure 2:
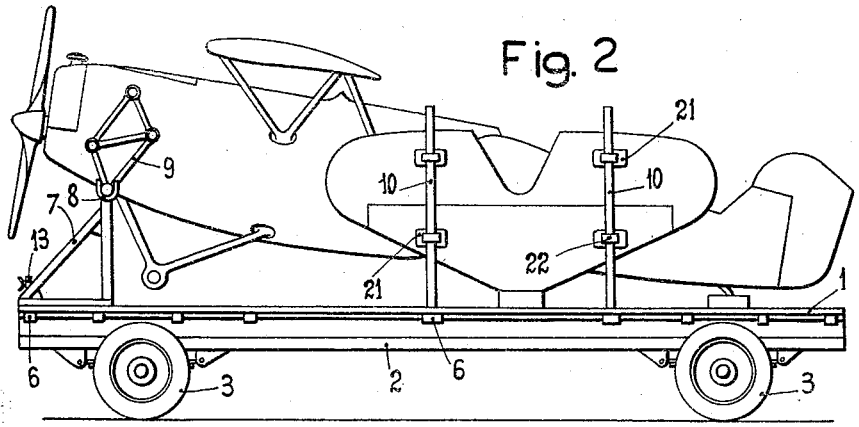
Figure 2 is a side view of the same vehicle having the fuselage and planes of an aeroplane located and fastened thereon.

Assuming the vehicle is intended to carry an aeroplane fuselage as shown in Figure 2, a frame as 7 is mounted on the platform 1, it carrying at its ends bearings 8 for a rigid skeleton 9 purposely located on said fuselage, and uprights 10 are similarly mounted on the vehicle platform to hold the fuselage in position and to support planes as shown.

Of course the frame 7 may have any shape as required by the particular fuselage or body to be carried, and it may be fastened in position by taking advantage of holes 4 of a front row and of platform holes 4'.

For such a purpose said frame 7 comprises a front cross bar 11 and a rear cross bar 12 (Figure 1) each having holes 29 adapted to register with holes 4, 4'; stems as 13 are inserted in registering holes 29 and 4, 4' to firmly engage cross bars 11 and 12 and frame 7 in position on platform 1.

In the embodiment illustrated in Fig. 5 each stem consists of a channel member 13 having a section to fit holes 29, 4, 4' and abutments 14 adapted to abut on bars 11, 12. Within the said channel stem 13 an arm 15 is located which is engaged therein by a transverse stud 16 and has intermediate its ends a boss 17 abutting on the bottom web of channel member 13. At its top end arm 15 has a screwthreaded stem 18 pivoted thereon, said stem 18 extending outwardly beyond web of channel members 3 and having a winged nut 19 screwed thereon. The opposite end of arm 15 provides a hook 20 in a location adapted for engagement with bottom edge of hole 4 or 4'. When the described parts are in the engaged position of Figure 5, the cross members 11 and 12 are firmly engaged on platform 1 and frame 7 cannot become detached from the vehicle.

By releasing nut 19, arm 15 may be caused to oscillate to retract its bottom hook 20 and to enable the stem 13 to be freely withdrawn from holes 4, 4', 29 in which it is engaged, thus leaving the frame 7 free.

Instead of using stems as 13 intended to be inserted through registering holes of bars 11, 12 and of platform 1, said engaging stems could be used to clamp bars 11, 12 on platform 1 with the aid of a separate member or of an arm projecting from said stem which then is engaged in position only in platform 1; in such a case the bars 11 and 12 of frame 7 are not required to have holes registering with those provided in the vehicle platform.

Figure 3:
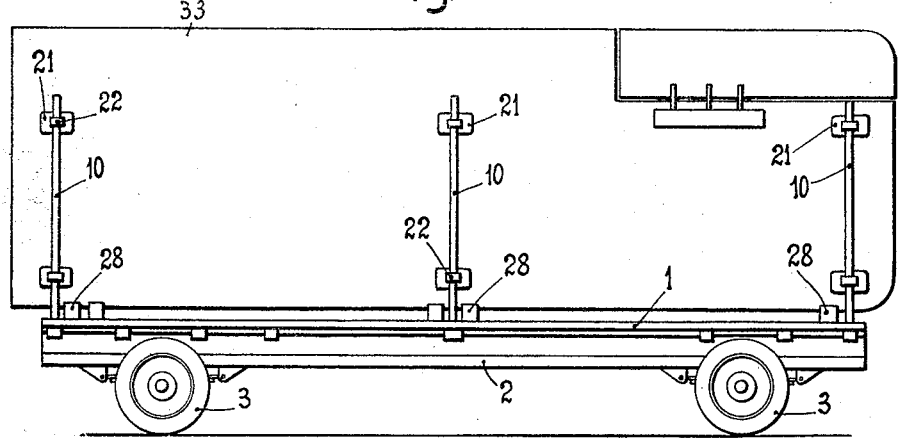
Figure 3 is a side view of a vehicle equipped to carry aeroplane wings.

When the vehicle is used to carry aeroplane wings as illustrated in Figures 3 and 4, such a vehicle is equipped with uprights as 10 which are then arranged in longitudinal rows receiving the wings between them.

Uprights 10 may have any preferred shape and each of them may be fastened by its bottom end in a hole 4 by the aid of means similar to those described in connection with fastening stems 13.

Figures 6, 7 and 8 illustrate the lower end of one of said uprights 10 and their clamping means which comprise abutments 14' bearing on the vehicle platform and an arm 15 having a hook 20 engaging the bottom surface of the seat member 6; said arm 15 is manipulated by means of a wing nut 18 and a screwstud 19. Holes 4 intended to receive uprights 10 must have a large height, to firmly hold said uprights in vertical position; for such a purpose said holes 4 are provided in transverse members 6 located under the vehicle frame, as above described.

The bottom end of each upright 10 may be secured by connecting means of different construction, and stems 13 or uprights 10 may be engaged in position by providing them with screwthreaded tails adapted to receive nuts, or by inserting transverse pins in said uprights and stems, or by clamping them by means of wedge members, set screws or the like.

To conveniently support aeroplane wings or the like, uprights 10 must be provided with resilient or soft pads mounted in an adjustable manner in order to cause them to exert a pressure at points of the wings structure adapted to support it, being known that aeroplane wings and similar structures comprise portions well adapted to withstand pressure (in register with members of their structure) and portions which have no substantial resistance (fabric covering).

Each of uprights 10 adapted to act as a support for wings is accordingly provided with one or more pads 21 of soft or resilient material mounted for adjustment both in the direction of the axis of upright 10 and in a direction perpendicular to middle vertical plane of the vehicle and also in a direction parallel with such a plane.

Such a result may be secured say by the arrangement of Figures 9 and 10 where on upright 10 is mounted a sleeve 22 having a set screw 23 or a suitable member for locking it in preferred position on the upright. Sleeve 22 has in turn an arm 24 solid therewith, on which an adjustable sleeve 25 is located such a sleeve 25 carrying a transversely movable rod 26 on whose end a pad 21 is fastened. Sleeve 25 has a locking clamp 33.

The rod 26 is perpendicular to arm 24 and arm 24 in turn is perpendicular to upright 10; pad 21 may thus take any desired direction and position and it may be arranged to abut on a wing or the like at any preferred point thereof.

Of course each upright 10 may carry a plurality of described devices, and each arm 24 or 26 may carry a plurality of pads as 21.

Another embodiment of the mounting for load fastening members is shown in Figures 11 and 12, these members in this construction consisting of rollers 30 instead of pads 21. Rollers 30 are carried by arms 27 pivoted with each other and adapted to be fastened say by means of studs or screws 31 in register with selected points of a sleeve 22' mounted to move on upright 10 and having perforations 32 for receiving studs 31 and a set screw 23' to clamp it in desired position on said upright. By this construction a restricted adjustment of fastening members is secured because said rollers 30 cannot move in the direction of their axis, but such an adjustment may be sufficient in many instances.

On the other hand pads 21 or rollers 30 or equivalent members may be mounted in other manners within the spirit of appended claims enabling them to be made operative at desired locations.

In any case after wings 33 having been located on the vehicle with their edges resting on soft supports 28 located on platform 1, members 21 or 30 are carried in position and they are forced against said wings and clamped in position by the described means. Wings 33 are thus safely clamped and they cannot be injured during the travel on account of shocks or of pressure of members intended to hold them in position.

Of course in spite in the above description the mounting and clamping means being recited as located on the vehicle platform, such a platform proper could be omitted, and mounting and clamping means could also be distributed on the frame or on transverse members fastened on such a frame.

The described construction provides for a vehicle adapted to carry any member of an aerial vehicle as fuselages, rudders, wings and the like, said vehicle being able to be easily and quickly equipped in any desired manner adapted for purpose aimed to. On the other hand the said vehicle may also be deprived of any superstructure and thus it may be used for usual loads.

The arrangement of this invention provides facilities for fastening on the vehicle members of complicated shape and also parts having a shorter length than the vehicle, because uprights as 10 may be located in holes 4 or 4' not lying on the same longitudinal or transverse line of the platform, to follow closely any complicated outline of member to be engaged on the vehicle.

Further parts having a length equal to distance intermediate two or more members 5 may be fastened on the vehicle, and parts of different lengths, sizes and shapes may be located adjacent to or on the extension of each other on the vehicle.

What I claim as my invention and desire to secure by United States Letters Patent is:

1. A vehicle for carrying members as aeroplane parts and the like comprising a wheeled structure, rows of engaging means transverse to and extending from side to side of said structure, said rows being spaced from and parallel with each other, fastening members adapted to be selectively and removably engaged with any of said engaging means, means for clamping said fastening members in said engaging means, load grasping means adjustable on each of said fastening members, and means for forcing said grasping means against said load.

2. A vehicle for carrying members as aeroplane parts and the like comprising a wheeled structure, rows of engaging means transverse to and extending from side to side of said structure, said rows being spaced from and parallel with each other, fastening members adapted to be selectively and removably engaged with any of said engaging means, means for clamping said fastening members in said engaging means, a sleeve adjustable on each of said fastening members, means for locking said sleeve in selected position on its cooperating fastening member, a load grasping member for each sleeve, and means for adjustably supporting said grasping member on said sleeve and for forcing it against load.

3. A vehicle for carrying members as aeroplane parts and the like comprising a wheeled structure, rows of engaging means transverse to and extending from side to side of said structure, said rows being spaced from and parallel with each other, fastening members adapted to be selectively and removably engaged with any of said engaging means, means for clamping said fastening members in said engaging means, a sleeve adjustable on each of said fastening members, means for locking said sleeve in selected position on its cooperating fastening member, an arm extending from said sleeve, a second arm adjustably supported by said first named arm and a load grasping member on said second named arm.

4. A vehicle for carrying members as aeroplane parts and the like comprising a wheeled structure, rows of engaging means transverse to and extending from side to side of said structure, said rows being spaced from and parallel with each other, fastening members adapted to be selectively and removably engaged with any of said engaging means, means for clamping said fastening members in said engaging means, a sleeve adjustable on each of said fastening members, means for locking said sleeve in selected position on its cooperating fastening member, arms adjustably extending from said sleeve, and load grasping members carried by said arms.

5. A vehicle for carrying members as aircraft parts or the like, comprising a wheeled structure, said structure having holes each with a vertical axis provided in it at different points in the longitudinal and in the transverse directions with respect to the axis of the vehicle, fastening members adapted to be removably inserted in any of said holes to form a superstructure for the vehicle, means for clamping said fastening members in said holes, load grasping means adjustable on each of said fastening members and means for forcing said grasping means against said load.

6. A vehicle for carrying members as aircraft parts or the like, comprising a wheeled structure, said structure having holes each with a vertical axis and of quadrangular profile provided in it at different points in the longitudinal and in the transverse directions with respect to the axis of the vehicle, fastening members adapted to be removably inserted in any of said holes to form a superstructure for the vehicle, means for clamping said fastening members in said holes, load grasping means adjustable on each of said fastening members and means for forcing said grasping means against said load.

In testimony whereof I have signed my name to this specification.

CARLO COHEN-VENEZIAN.